US007904505B2

(12) United States Patent
Rakers et al.

(10) Patent No.: US 7,904,505 B2
(45) Date of Patent: Mar. 8, 2011

(54) SERVICE TO PUSH AUTHOR-SPOKEN AUDIO CONTENT WITH TARGETED AUDIO ADVERTISING TO USERS

(75) Inventors: Matthew A. Rakers, Aviston, IL (US); David L. Dunmire, San Antonio, TX (US); Brian M. Novack, St. Louis, MO (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1483 days.

(21) Appl. No.: 11/265,771

(22) Filed: Nov. 2, 2005

(65) Prior Publication Data

US 2007/0097975 A1    May 3, 2007

(51) Int. Cl.
G06F 15/16    (2006.01)
(52) U.S. Cl. ......... 709/203; 709/217; 709/226; 709/228; 725/18
(58) Field of Classification Search .................. 709/203, 709/217, 226, 228; 725/18
See application file for complete search history.

(56) References Cited

U.S. PATENT DOCUMENTS

| | | | |
|---|---|---|---|
| 5,926,624 A | 7/1999 | Katz et al. | |
| 6,035,336 A | 3/2000 | Lu et al. | |
| 6,138,151 A | 10/2000 | Reber et al. | |
| 6,170,060 B1 | 1/2001 | Mott et al. | |
| 6,253,237 B1 | 6/2001 | Story et al. | |
| 6,560,651 B2 | 5/2003 | Katz et al. | |
| 6,742,127 B2 | 5/2004 | Fox et al. | |
| 6,807,574 B1 * | 10/2004 | Partovi et al. | 709/224 |
| 6,970,915 B1 * | 11/2005 | Partovi et al. | 709/217 |
| 7,197,544 B2 * | 3/2007 | Wang et al. | 709/219 |
| 7,330,890 B1 * | 2/2008 | Partovi et al. | 709/224 |
| 2001/0047384 A1 * | 11/2001 | Croy | 709/203 |
| 2001/0048736 A1 | 12/2001 | Walker et al. | |
| 2002/0023230 A1 | 2/2002 | Bolnick et al. | |
| 2002/0046181 A1 | 4/2002 | Story, Jr. et al. | |
| 2002/0053078 A1 | 5/2002 | Holtz et al. | |
| 2002/0059073 A1 | 5/2002 | Zondervan et al. | |
| 2002/0065074 A1 | 5/2002 | Cohn et al. | |
| 2002/0097842 A1 | 7/2002 | Guedalia et al. | |
| 2002/0165937 A1 * | 11/2002 | Nitta et al. | 709/217 |
| 2003/0001880 A1 | 1/2003 | Holtz et al. | |
| 2003/0005052 A1 * | 1/2003 | Feuer et al. | 709/204 |
| 2003/0023973 A1 * | 1/2003 | Monson et al. | 725/34 |
| 2003/0052913 A1 | 3/2003 | Barile | |
| 2003/0130894 A1 | 7/2003 | Huettner et al. | |
| 2003/0135488 A1 | 7/2003 | Amir et al. | |
| 2004/0003398 A1 | 1/2004 | Donian et al. | |
| 2004/0031058 A1 | 2/2004 | Reisman | |
| 2004/0032393 A1 | 2/2004 | Brandenberg et al. | |
| 2004/0068536 A1 | 4/2004 | Demers et al. | |

(Continued)

*Primary Examiner* — Michael Won
(74) *Attorney, Agent, or Firm* — Toler Law Group

(57) ABSTRACT

An audio content item, submitted by and spoken in a voice of an author, is received and registered along with an insertion point and associated content information. An audio advertisement submitted by an advertiser is received and registered. At least one targeting criterion is associated with the audio advertisement. User information and at least one content pushing criterion are stored for a user. Without being selected by the user, the audio content item is automatically selected for pushing to the user based on the content information satisfying the at least one content pushing criterion. The audio advertisement is automatically selected for insertion at the insertion point based on the content information and the user information satisfying the at least one targeting criteria. A package that includes the audio content item with the audio advertisement inserted at the insertion point is created and pushed to the user.

19 Claims, 3 Drawing Sheets

U.S. PATENT DOCUMENTS

| | | |
|---|---|---|
| 2004/0086120 A1 | 5/2004 | Akins, III et al. |
| 2004/0117827 A1 | 6/2004 | Karaoguz et al. |
| 2004/0253945 A1 | 12/2004 | Janik |
| 2005/0050097 A1 | 3/2005 | Yeh et al. |
| 2005/0108754 A1 | 5/2005 | Carhart et al. |
| 2005/0180549 A1* | 8/2005 | Chiu et al. ............... 379/88.16 |
| 2005/0193341 A1 | 9/2005 | Hayward et al. |
| 2005/0216346 A1* | 9/2005 | Kusumoto et al. ............ 705/14 |
| 2007/0050257 A1* | 3/2007 | Fine et al. ..................... 705/14 |
| 2007/0078713 A1* | 4/2007 | Ottt et al. ..................... 705/14 |
| 2007/0276726 A1* | 11/2007 | DiMatteo ..................... 705/14 |
| 2008/0287150 A1* | 11/2008 | Jiang et al. ................... 455/466 |

* cited by examiner

SERVICE TO PUSH AUTHOR-SPOKEN AUDIO CONTENT WITH TARGETED AUDIO ADVERTISING TO USERS

FIELD OF THE DISCLOSURE

The present disclosure relates to methods and systems for distributing audible content.

BACKGROUND

Many individuals have hectic schedules that leave little time to read newspapers, magazines and books. Some individuals get their news from broadcast radio while driving in their cars. However, broadcast radio is programmed for a mass audience and not to the specific interests of each listener.

Some areas have radio broadcasts that serve the blind and visually impaired. In these radio broadcasts, portions of newspapers and magazines are read aloud by a volunteer or a staff member of the broadcast service. The spoken words are typically transmitted in a sub-carrier of a radio station in the area. Since each newspaper or magazine may have only a 30-minute or 60-minute time slot, the listeners have access to only few of the articles therein.

Audible.com provides a service that allows users to make selections of audio books and audio newspapers. The service downloads, to a user, those audio books and audio newspapers that were selected by the user.

BRIEF DESCRIPTION OF THE DRAWINGS

The present disclosure is pointed out with particularity in the appended claims. However, other features are described in the following detailed description in conjunction with the accompanying drawing in which:

DETAILED DESCRIPTION OF THE DRAWINGS

Disclosed herein are embodiments of a service that pushes personalized audio content item to listeners based on their profiles without the audio content items having been selected by the listeners.

In one embodiment, the system comprises at least one user interface component to receive and store, in a user profile, user information and at least one content pushing criterion associated with a user.

The system further comprises at least one audio content registry component to receive and register an audio content item submitted by and spoken in a voice of the author. The at least one audio content registry component further receives and stores an indication of an insertion point for the audio content item. The at least one audio content registry component still further receives and stores content information associated with the audio content item.

The system further comprises at least one audio advertising registry component to receive and register an audio advertisement submitted by an advertiser, and to receive and store at least one targeting criterion associated with the audio advertisement.

A download packager automatically selects the audio content item for pushing to the user based on the content information satisfying the at least one content pushing criterion. The download packager automatically selects the audio advertisement for insertion at the insertion point based on the content information and the user information satisfying the at least one targeting criteria. The download packager creates a package that includes the audio content item with the audio advertisement inserted at the insertion point.

A push component automatically pushes the package to the user without the user selecting the audio content item for download.

Figure 1:
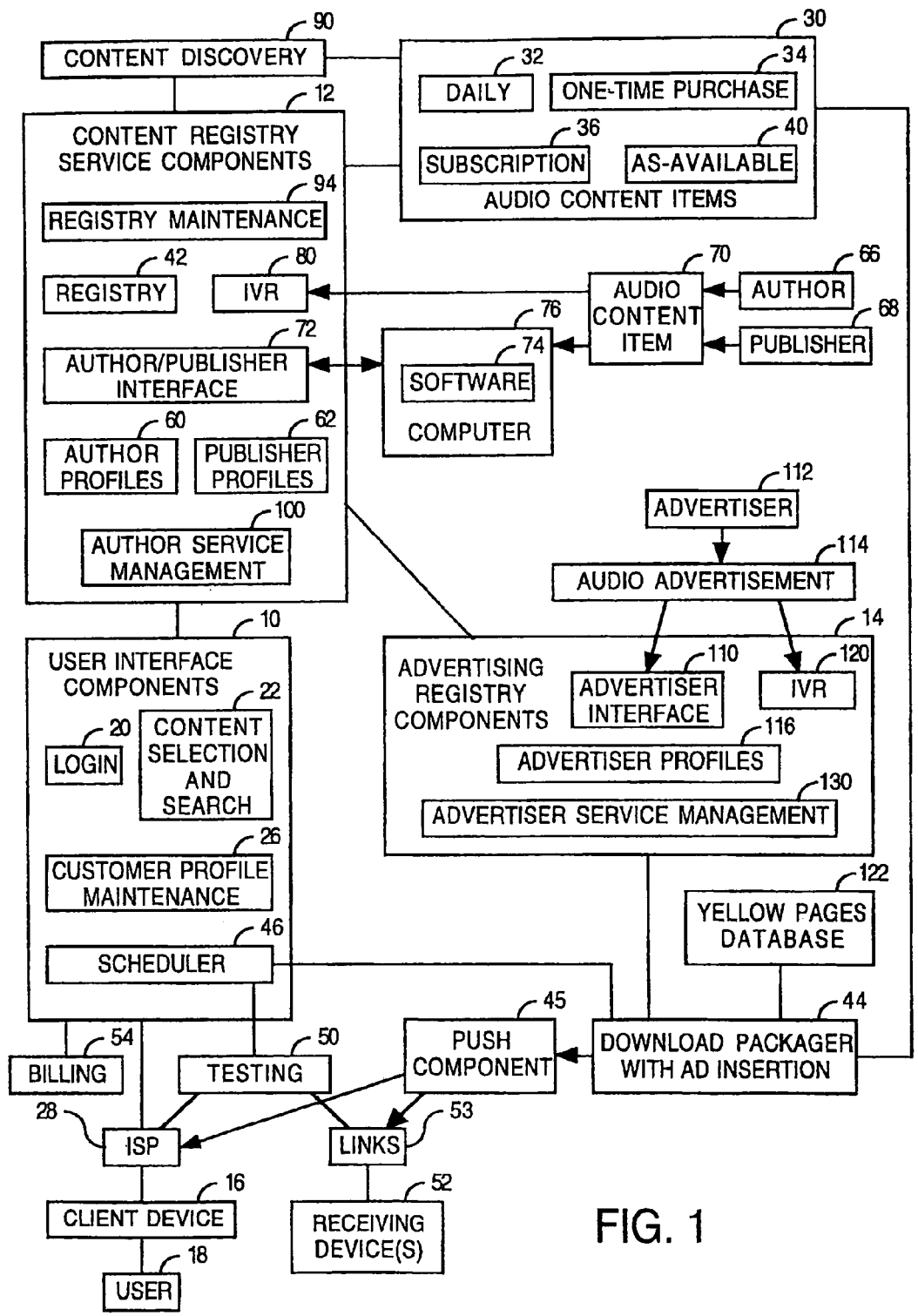
FIG. 1 is a block diagram of an embodiment of a system to provide personalized audio content.

FIG. 1 is a block diagram of an embodiment of a system to provide personalized audio content. The service provides both push and pull audio download features. The system comprises one or more user interface components 10, one or more content registry service components 12, and one or more advertising registry service components 14.

The user interface components 10 can include various user interfaces that can be provided by a Web site or another computer site. The computer site is accessible by a client device 16 of a user 18 via the Internet or another computer network. The client device 16 may be a computer, a personal digital assistant or a wireless telephone, for example.

The user interface components 10 can include a login interface 20 that allows users to login to the service. The login interface 20 may require a valid user identifier and/or password to be entered by the user 18 before the user 18 is given access to features of the system.

After logged-in, one or more user interfaces are provided to the user 18 so that the user 18 can view an overview of available audio content, search for audio content items, make selections of particular audio content items, set preferences and other pushing criteria to automatically receive pushed audio content, and setup a schedule for receiving the selected audio content items.

Some of the user interfaces are content search and selection user interfaces 22. The content search and selection user interfaces 22 are receptive to user input to search for and select audio content items of interest to the user 18. The user 18 can subscribe to audio content of interest using the content search and selection user interfaces 22.

Another of the user interfaces is a customer profile maintenance interface 26. The customer profile maintenance interface 26 enables users to modify and save their preferences, content pushing criteria and current selections. Each user account has an associated customer profile to store the preferences, content pushing criteria and current selections of its associated user. A customer profile may be saved locally at the client device 16, with an Internet Service Provider (ISP) 28 of the user 18, or at a server that provides the computer site. The content pushing criteria are used to help with finding and delivering content to the user.

The service provides access to a wide variety of audio content items 30 to the users. Examples of audio content items 30 that are available include, but are not limited to, daily content items 32, one-time purchase items 34, subscription items 36 and as-available items 40. The audio content items 30 are identified by a registry 42. The content search and selection user interfaces 22 accesses the registry 42 to list available audio content items to the user 18.

In an illustrative embodiment, the daily content items 32 are items that are updated at least once per day. The content search and selection user interfaces 22 may display information for those daily content items 32 listed in the registry 42 that are available to the user 18. The content search and selection user interfaces 22 are receptive to a user-selection of which one or more daily content items 32 the user 18 wishes to download. For a selected daily content item, updates can be scheduled for delivery once a day or when the requested information is published.

In a particular embodiment, the one-time purchase items 34 include audio books and other audio content that is purchased usually once. Further, the subscription items 36 can include items that are published periodically such as magazines, audio books in monthly audio book clubs, and newsletters. The content search and selection user interfaces 22 display information for those one-time purchase items 34 and those subscription items 36 that are available to the user 18. The content search and selection user interfaces 22 are receptive to a user-selection of which items the user 18 wishes to purchase and/or subscribe.

In another particular embodiment, the as-available items 40 are items that may not be currently available, but will be automatically selected for and pushed to the user 18 based on the user's topics of interest. The content search and selection user interfaces 22 enable the user 18 to subscribe to a service to receive as-available items of interest to him/her. The subscription may be to automatically push paid content and/or free content, when available, to particular the user 18 based on his/her topics of interest. The as-available items 40 may include news, sports, weather and other subjects. For example, the user 18 may wish to receive audio sports updates that involve his/her college team (e.g. when a score comes in) or his/her favorite baseball team (e.g. when the baseball game completes). These items would be automatically retrieved by a download packager 44 which creates a download package of the items. A push component 45 automatically pushes the download package to the user 18.

In a particular embodiment, the content search and selection user interfaces 22 may include multiple pages that segregate free content from purchasable content. A free content page may list major categories and provide search and drill down capabilities to easily select desired web pages. A purchasable content page may list periodicals, newsletters and other paid content by category for one-time or repeated purchases.

In one embodiment, the content search and selection user interfaces 22 organize the audio content items into the following major sections: news, sports, weather, finance, entertainment, travel, music, education (primary school through college learning audio), government and/or politics, local (based on ZIP code, postal code, or other location data of a registered user), what's new (a page listing new registered providers of MP3 or other audio content for users to select), and what's hot (a page listing the most popular downloaded audio).

Using the content search and selection user interfaces 22, users can search the audio content items using any one or more the following criteria: date, author, publisher, type of content (e.g. free, subscription or one-time purchase), content rating (general, parental review suggested or restricted), sponsor, category and key words. Based on the search criteria, a set of search results is generated. The search criteria and/or search results are collected into a hold bin for further refining or for delivery. Any of the above criteria can also be set as a content pushing criterion by the user 18.

A scheduling component 46 enables users to set a time of day that their selected downloads are to take place. In general, the time of day varies from user-to-user based on each user's lifestyle and schedule. Optionally, the scheduling component 46 also schedules delivery of content information to each user. The content information can be printed daily on the user's end (e.g. by a printer in communication with the client device 16). For example, some users may schedule to receive their downloads between 3:00 A.M. to 7:00 A.M. local time, and to receive and print a hard copy of the content information each morning.

Based on current content and the user's selection and pushing criteria, the scheduling component 46 can estimate a number of likely hits at a scheduled time for delivery. As the user 18 selects audio content items, the content search and selection user interfaces 22 estimate a delivery time for the selected audio content items. The system can display the estimated delivery time for selected audio content items in addition their topic(s), author(s) and length(s).

The delivery time can be estimated based on an average delivery time per unit of data and a data length of the selected audio content items. For example, the estimated delivery time can be based on a respective average delivery time per MB for each of the following cases: DSL/cable modem, speeds up to 384 kbps, speeds between 384 kbps and 1.5 mbps, speeds greater than 1.5 mbps, and dialup 56 kbps.

Optionally, a testing component 50 can measure a download speed for each user's connection. In this case, the delivery time can be determined based on the measured download speed.

The system may have other components to provide other usability features that help with downloading content.

The downloads are made to one or more receiving devices 52 (which may include the client device 16) associated with a user's account. Examples of the receiving devices 52 include, but are not limited to, personal computers (PCs), personal digital assistants (PDAs), CD read/write drives, wireless telephones (e.g. cellular telephones) equipped with a digital audio player (e.g. an MP3 player) and a removable memory medium (e.g. a memory card) to store downloaded content, automotive audio systems equipped with a digital audio player, wearable digital audio players and CD read/write drives.

Some receiving devices are conducive to receiving content items at substantially any time of day. For example, content items can be scheduled for delivery at substantially any time during the day to a PC having a DSL connection or a cellular telephone. In an embodiment, a cellular telephone receives the audio content items delivered via a data service and stores the audio content items in a memory card for later playback.

Multiple receiving devices can be associated with a user's account. If so, each of the receiving devices can receive downloads, and each can have its own schedule to receive downloads. For example, multiple MP3 devices can be registered to the user's computer and then to the Web site. Roaming updates via WiFi devices and wireless-enabled data services devices may be supported. PDAs and/or cell phone devices that support MP3 downloads can receive pushed updates when available and when in a coverage area.

In some cases, mobile phones and other devices can receive downloaded content in an MP3 format by docking the device to their home PC (e.g. docking to the client device 16). Alternatively, mobile phones and other devices with wireless capabilities can directly receive the downloaded content via a wireless data service.

The downloads can be delivered by one or more links 53 such as a broadband network link (e.g. a digital subscriber line or a cable-modem-based link), a satellite link, a dial-up connection, or a wireless data network such as a cellular data network. Optionally, the downloads can made by an email delivery of audio and text.

Based on the user selections, a billing component 54 automatically bills, credits, or debits an account associated with the user 18 in return for providing the audio content. The manner in which the billing component 54 bills, credits or debits the account is based on a class of service selected by the user 18. Various classes of services may be offered to the users.

One class is a periodic subscription (e.g. a monthly subscription) to the service for a periodic fee (e.g. a monthly fee). A subscriber in this class is given monthly credits to download subscriptions, music content, audio newsletters, audio books and other audio content. For example, an ISP monthly service may allow a certain dollar amount of content to be downloaded per month as part of the service. Monthly credits may accumulate month-to-month to allow for larger purchases or for gifts to other parties. Various service levels (bronze, silver, gold, premium) may be established within this class.

Another class is a pay-per-use service. In this service, users pay for each download. Payment can be made by credit card, debit card, or by subtracting from an ISP service bank account. Delivery can be certified by transaction authentication.

The billing component 54 may communicate with an external credit card authority to ensure that credit card numbers used for payment and billing are valid and authorized.

The customer profile maintenance interface 26 may provide maintenance screens to help manage a current selection schedule, a customer location to help identify local content, and a history of customer selections/purchases in addition to user content preferences.

Some of the audio content items 30 are submitted by various authors and publishers to the service. Author profiles 60, one for each author, are maintained for the various authors. An author profile contains high-level information about an author and his/her registered content. The high-level information can include a brief biography of the author, a picture of the author, and topics published by the author. The high-level information can be displayed to users to better understand those who submit the audio content items 30.

Further, the author profile saves preferences of the author to assist with the submission of articles. Each mode of submitting audio content can have its own set of preferences stored in the author profile for the author. For example, an author may have a first set of preferences when submitting audio content from a personal computer (e.g. a laptop or notebook computer), a second set of preferences when submitting audio content from a PDA or a wireless telephone, and a third set of preferences when submitting audio content by telephone to an Interactive Voice Response (IVR) unit.

Publisher profiles 62, one for each publisher, are maintained for the various publishers. A publisher profile associates a publisher with its authors. For example, a particular newspaper may have several authors listed in its publisher profile. The publisher profile contains basic information about the publisher, e.g. its subscription information, phone numbers and Web sites.

The authors and publishers, such as an author 66 or a publisher 68, can register an audio content item 70 by providing textual content information about the audio content item 70 and its location in one or more messages to an author/publisher interface 72 included in the content registry component 12. The textual content information about the audio content item 70 may include title information, author information, topic information, key words and other key indexed information. The textual content information is usable to assist users searching for content. The textual content information is also usable to detect which users are to automatically receive the audio content item 70 (e.g. based on the users' topics of interest and/or pushing criteria).

Software 74 may be provided to the authors and publishers assist in interacting with the author/publisher interface 72. The software 74 may be installed to a computer 76 of the author 66 or the publisher 68.

The software 74 may function to capture and record audio during the creation of the audio content item 70. The software 74 also assists in article submission, which includes uploading the audio content item 70 to the author/publisher interface 72 and automatically registering the audio content item 70 with the content registry component 12. The software 74 further assists the author 66 or the publisher 68 to identify and enter the textual information associated with the audio content item 70. The software 74 can automatically populate data elements into an XML format or an alternative format based on the textual information. The software 74 is receptive to input by the author 66 or the publisher 68 as to where insertion marks for advertising inserts are to be located. Using the software 74, the author 66 may exclude particular advertisers from inserting their advertisements into the audio content item 70.

The software 74 and/or the author/publisher interface 72 may require a valid password to be entered before causing the audio content item 70 to be registered. The author's profile and preferences can be loaded upon login by the author 66. The software 74 may send an encrypted version of the audio content item 70 to the author/publisher interface 72 which, in turn, decrypts the received version.

The software 74 may be purchased and setup for training or briefings. This allows technical briefings to take place with audio content, versus having to read briefings. The software 74 may be customizable by the authors and publishers.

As an alternative to the software 74, an Interactive Voice Response (IVR) unit 80 can enable the author 66 and other authors to create the audio content item 70 by telephone. The IVR 80 is beneficial to reporters who wish to provide content from remote locations and/or immediately when news is breaking. The IVR 80 prompts the author 66 for basic article information when submitting the audio content item 70. To reduce the amount of information that the author 66 needs to input using the IVR 80, default information is retrieved from the author profile of the author 66.

The IVR 80 can provide options within a telephone call for the author 66 to record the audio content item 70, to indicate the insertion point, to input the content information (which may be converted from speech-to-text by the IVR 80), to indicate a start date/time at which the audio content item 70 is made available for pushing to users, and to indicate an end date/time at which the audio content 70 is no longer available for pushing to users. The IVR 80 may provide these options upon receiving a valid author identifier and password from the author 66 in the telephone call.

Based on information entered for the submission, the author's profile and preferences can be automatically updated for use in future audio submissions.

Others of the audio content items 30 are found by a content discovery component 90. The content discovery component 90 searches registered Web sites (e.g. ones that provide news) on the Internet for available audio articles and other audio content items under particular headings. The content discovery component 90 may search the Internet using crawler technology to find audio content items for particular topics. In general, each Web site may be searched on-demand, periodically (e.g. daily) or otherwise repeatedly.

The registry 42 lists all audio content items (either registered or found on the Internet) available for audio download. The registry 42 is searchable in an indexed manner or other manners. For each audio content item, the registry 42 stores any combination of its topic, title, key words, length, creation time and date, rating, author and publisher.

The content registry components 12 include a registry maintenance component 94. The registry maintenance component 94 maintains the data in the registry 42. The registry maintenance component 94 periodically (e.g. daily) or otherwise repeatedly checks that each audio content item in the registry 42 still exists. If an audio content item no longer exists, its entry is automatically removed from the registry 42. The registry maintenance component 94 may also determine if any of the audio content items are objectionable (e.g. contain words not proper for publishing and/or unacceptable to the FCC). If an audio content item is deemed objectionable, its entry is automatically removed from the registry 42. Otherwise, each audio content item remains registered and available for selection by users for a life expectancy dictated by its author, its publisher and/or the service.

The audio content items 30 can be stored at one or more central locations and/or geographically diverse locations. Some of the audio content items 30 (e.g. some free content) may be available at other Web sites, such as Web sites controlled by authors, publishers and audio content providers. These of the content items may be directly accessed from the other Web sites for download to users. Others of the audio content items 30 (e.g. purchasable or subscription content) may be stored by mass storage media of the service (e.g. a service disk storage). Expenses associated with storage by the service may be charged to the authors or publishers or included in a delivery fee.

The audio content items 30 can be encoded in a variety of digital formats including but not limited to MP3 files. Compression routines can be used to further compress the audio content items 30 to reduce delivery times to various receiving devices.

The system may comprise an author service management component 100 that maintains, for each registered author, history information related to submissions of audio content submitted by the registered author. The author service management component 100 may also track how many downloads were performed for each audio content item either over a particular time period or cumulatively. The author service management component 100 can output a report that summarizes the above information to the registered author or his/her publisher. The author and/or his/her publisher can use figures in the report (e.g. a number of subscribers self-described as being interested in the author's work) to support selling niche audio advertising for insertion in the author's audio content items. This is one benefit to the authors who register and submit the audio content items to the service. Other benefits to the authors include their gaining greater exposure, a larger audience, and a new way to have their work discovered by others.

The advertising registry components 14 are used to register advertisements for insertion into the audio content items as downloads are packaged. The advertising registry components 14 include an advertiser interface 110 where registered advertisers can obtain information about any of the audio content items listed in the registry 42 (e.g. those registered or found on the Internet and available for audio download). The advertiser interface 110 outputs a list of the audio content items along with descriptive key words to delineate one type of content from another. The advertiser interface 110 enables the registered advertisers to search for particular audio content items having particular criteria (e.g. any combination of a topic, a title, key words, a length, a creation time and date, a rating, an author, a publisher and download counts).

A potential advertiser 112, which may be any Yellow Pages advertising customer, can review content types, keywords, previous download counts by geographical region, and sample submissions to determine where he/she would like to advertise. Upon determining where to advertise, the potential advertiser 112 can register an audio advertisement 114 and associate the audio advertisement 114 with particular targeting criteria. The targeting criteria may comprise any combination of a title, a length, a creation time and date, a rating, an author, a publisher, download counts, particular content types, and particular keyword combinations associated with the content types.

The targeting criteria may comprise exclusion criteria (i.e. criteria that excludes an audio advertisement from being inserted into an audio content item), inclusion criteria (i.e. criteria that is necessary for an audio advertisement to be inserted into an audio content item), or suggested criteria (i.e. criteria that is suggested, but not necessary, for an audio advertisement to be inserted into an audio content item). The exclusion criteria may comprise a list of excluded terms for the content information and/or the advertiser profile. The inclusion criteria may comprise a list of necessary terms for the content information and/or the advertiser profile. The suggested criteria may comprise a list of suggested terms for the content information and/or the advertiser profile.

Advertiser profiles 116, one for each advertiser, are maintained for the various registered advertisers. Each advertiser profile saves profile information of the advertiser. The profile information is used to assist in the process of assigning appropriate content to the audio advertisement by the download packager 44. The profile information may include geographical location data, such as a ZIP code or a postal code, of the advertiser 112. The geographical location data is usable to drive specific local advertisements to local listeners, e.g. based on the listeners' ZIP code or postal code.

Each advertiser profile also saves preferences of its associated advertiser to assist with the submission of audio advertisements. Each mode of submitting audio advertisements can have its own set of preferences stored in the advertiser profile for the advertiser 112. For example, the advertiser 112 may have a first set of preferences when submitting audio advertisements from a personal computer (e.g. a laptop or notebook computer), a second set of preferences when submitting audio advertisements from a PDA or a wireless telephone, and a third set of preferences when submitting audio advertisements by telephone to an Interactive Voice Response (IVR) unit.

The advertiser interface 110 may require a valid password to be entered before causing the audio advertisement 114 to be registered. The advertiser's profile and preferences can be loaded upon login by the advertiser 112. Previous advertisements created by the advertiser 112 are made accessible to the advertiser 112 upon login. The advertiser interface 110 can be used to update advertisements.

The advertising registry components can also include an IVR unit 120 that can enable the advertiser to create the audio advertisement 114 by telephone. The IVR 120 is beneficial to advertisers who wish to create audio advertisements from remote locations and/or immediately when an event is breaking. The IVR 120 may prompt the advertiser 112 for targeting criteria when submitting the audio advertisement 114. To reduce the amount of targeting information that the advertiser 112 needs to input using the IVR 120, default targeting information is retrieved from the advertiser profile for the advertiser 112.

The IVR 120 can provide options within a telephone call for the advertiser 112 to record the audio advertisement 114, to input the at least one targeting criterion (which may be converted from speech-to-text by the IVR 120), to indicate a start date/time at which the audio advertisement 114 is made available for insertion, and to indicate an end date/time at which the audio advertisement 114 is no longer available for insertion. The IVR 120 may provide these options upon receiving a valid advertiser identifier and password from the advertiser 112 in the telephone call.

Based on information entered by the advertiser 112 using the IVR 120, the advertiser's profile and preferences can be automatically updated for use in future audio advertisement submissions.

Daily downloads can be evaluated automatically for keywords to determine which Yellow Pages customer advertising is to be integrated with the package and at what points in each download. A Yellow Pages database 122 can be accessed to determine which audio advertisement to insert into which audio content item for which end listener.

Examples of how the Yellow Pages database 122 can interact with advertisement targeting are as follows. At least one targeting criterion to insert the audio advertisement 114 into the audio content item 70 can be based on the advertiser 112 having an associated data element in the Yellow Pages database 122 that matches or is close to a term in the content information for the audio content item 70. For instance, the associated data element used in the targeting criterion can be a category of the advertiser 112 as defined by the Yellow Pages database 122. In this case, the category of the advertiser 112 may be compared to the keywords for the audio content item 70. In another instance, the associated data element used in the targeting criterion can be a location of the advertiser 112 as defined by the Yellow Pages database 122. In this case, the location may be compared for closeness to a location associated with the audio content item 70.

At least one other targeting criterion to insert the audio advertisement 114 into the audio content item 70 can be based on the advertiser 112 having an associated data element in the Yellow Pages database 122 that matches or is close to a term in the profile of the user 18. Similar to above, the associated data element used in the targeting criterion can be a category and/or a location of advertiser 112 as defined by the Yellow Pages database 122. For instance, the category of the advertiser 112 may be compared to the keywords in the user profile, and/or the location of the advertiser 112 can be compared for closeness to a location of the user 18.

The system may comprise an advertiser service management component 130 that maintains, for each registered advertiser, history information related to submissions of audio advertisements submitted by the registered author. The advertiser service management component 130 may also track how many inserts were performed for each audio advertisement either over a particular time period or cumulatively. The advertiser service management component 130 also tracks which audio content items had the audio advertisement inserted and a generalized geographical area of the users that downloaded the audio content items. The advertiser service management component 130 can output a report that summarizes the above information to the registered advertiser. The advertiser can use figures in the report (e.g. a number of subscribers self-described as being interested in the author's work) to better target its advertisements to customers who may be interested in its products. This is one benefit to the advertisers who register and submit the audio advertisements to the service. Other benefits to the advertisers include their gaining greater exposure to a larger and potentially-localized audience.

Thus, using the aforementioned system, each user can receive particular audio content items of interest to him/her on an ongoing basis (e.g. on a daily basis). Playback features such as rewind, fast-forward and pause can be provided to the listeners' playback devices. For example, listeners can rewind the last few sentences of an audio content item to confirm what was said, or can fast forward to a pertinent area of interest, or can pause the audio content item to take a telephone call and resume playback after completion of the telephone call.

Various examples of hypothetical user experiences using the herein-disclosed system are as follows.

Audio news information can be automatically pushed to users based on their preferences. Local news from a user's home city can be automatically pushed to the user while he/she is traveling out-of-town. Particular news topics of interest to a user can be automatically pushed to the user. For example, a user interested in events in Iraq can automatically receive audio articles pertaining to Iraq as provided by US, UK, French and Iraqi news agencies. Special reports provided by National Public Radio may be automatically pushed, as they become available, to a user based on the user's topics of interest.

Daily audio content about a user's favorite sport and/or team, by author, can be automatically pushed to the user. Opposing city views regarding the user's local team can be automatically pushed to the user (e.g. Chicago's articles on an upcoming St. Louis Rams game). Daily editorial articles, each read in the voice of its author, can be automatically pushed to users. Local high school scores and summary reports, both in an audible form, can be pushed to users based on their home location. A sports talk radio highlight-of-the-day can be automatically pushed to users.

Audio travel information can be automatically pushed to users based on their preferences. Users can keep track of travel tidbits for areas they plan to visit or want to keep up on. Travel destinations (e.g. Napa Valley, Orlando and New York) or travel agents can provide audio tourism information that is pushed to users prior to their trips. Tourist locations can provide a short audio summary to allow users to determine whether they would like to visit. For example, a user can make a selection to receive audio summaries about the top twelve wineries in Napa Valley. These audio summaries are downloaded to the user to help the user learn more about the area and determine which wineries he/she would like to visit. When a user arrives at his/her destination, wireless transmitters may provide additional audio information. For example, as users drive by a local winery in southern California, an MP3 wireless transmitter may transmit an audio summary of the winery's history and reasons to visit. Wireless transmitters, such as WiFi transmitters, can be disposed along interstate roadways to transmit audio articles that note local attractions, history, and points of interest. Similar topics could be published and accessed while driving by and stopping for gasoline. State and local governments can provide audio content items that contain welcome greetings.

Audio education material can be delivered to users. The audio education material may comprise content provided by students, schools, universities and publishers. The audio education material may comprise class room audio so that a user can listen to a class lecture when unable to attend in person. The audio education material may comprise Internet-based training in an audio rather than textual form. Users can download registered content for research papers or learning, audio books, and short "how-to" lessons.

Local audio content can be pushed to users. The local audio content may comprise content provided by local newspapers, local schools and local radio stations. Users can receive and listen to their local sport team(s) scores and highlights while traveling to work, or away from home. Users can receive and listen to the local morning news/sports/obituary/market report they may often miss during their busy lives and schedules. Users can receive and listen to a local schedule of local meetings, local sports activities and local entertainment. Users can receive and listen to weekly school schedules.

Audio religious content can be pushed to users. The audio religious content can be provided by ministries, churches, pastors and publishers. Examples of the audio religious content include a daily message, daily church readings and homilies, and Bible passages and scriptures. The audio religious content can be read by the user's pastor. Home-bound users, nursing-home-bound users, or on-the-go users would benefit from this content delivery.

Audio political content can be pushed to users. The audio political content can be provided by local/state/federal offices, reporters, politicians and special interest groups. Examples of the audio political content include newsletters, news and views, scheduled events, schedules for House or Senate hearings or proceedings, audio content from House or Senate hearings or proceedings, audio content from judicial proceedings, and summaries of laws passed or failed which may be narrowed by a key word search.

Periodicals or content therefrom can be pushed in an audio form to users. The periodicals may be purchased or free magazines, newspapers, newsletters or periodicals. Users can purchase daily, weekly or monthly subscriptions to audible versions of various magazines. A truck driver, for example, can listen to an audio form of an auto racing magazine while he/she drives his/her route. A commuter, who drives one to two hours each day to work, can listen to an audio form of various magazines while he/she drives. Articles in the magazine may be read by their authors in the audio form.

Targeted audio technology content can be pushed to users. The particular audio technology content may be targeted to a user may be based on his/her trade. Examples of the audio technology content include various technology briefings, articles regarding manufacturing, articles regarding computer technology, and updates from vendors.

Investigative audio content can be pushed to users. Examples of the investigative audio content include archived audio notes and research from criminal investigations, and a read-out from a previous lead for a shift change.

Many business methods can be associated with the service. The service can charge other entities for their participation. A listener can be charged based on any combination of his/her registration, number of downloads, content size, or types of downloads. An author or content distributor can be charged for registering its audio content items, hosting its downloads, distributing a quantity of its downloads, or distributing based upon size.

The audio content itself can be a revenue source by automatically inserting advertising specifically related to the customer who is receiving the download. The service can insert advertising more effectively that the individual author because of its knowledge of listener's interests that span multiple download types and relate to a specific product. For example, a listener in San Antonio, Tex. who has downloaded Weather in Port Arkansas and Sport Fishing Magazine may be targeted to receive audio advertisements that include boat charters in Port Arkansas, sailing lessons in Port Arkansas and sport fishing equipment stores in San Antonio.

Keywords used to determine these more effective linkages may be determined during the sale of Yellow Pages services for another fee. Reports which convey how many customers received the advertisement on a daily, weekly, or monthly basis can be conveyed to Yellow Pages customers for a fee.

Optionally, the service can be tied to existing Internet information, shopping and entertainment services.

In conclusion, the service enables authors and content providers to deliver their stories to an audience who is often on the go and unable to read or see their story because of the audience's busy lifestyle. The service encourages the authors to record their stories in their own voices to reflect emotional ties they may have with the stories they wrote. Each listener can receive his/her favorite sports section, business section, or entertainment section of a newspaper read to him/her by his/her favorite columnist or author.

The service also enables advertisers to target their advertisements for insertion in the pushed audio content. For Yellow Pages and White Pages customers, the targeted advertising is selected based upon data in a Yellow Pages database.

The service is beneficial for individuals who commute one or more hours in a day, individuals who drive for a living, individuals whose hectic schedule leave little time to read or watch television, individuals who would rather listen than read, individuals tired of listening to broadcast radio, and individuals wanting personalized content that they are unable to find on broadcast radio. The service can turn hours of drive time into productive and enjoyable time. The service may serve those listeners who wish to receive their daily gospel message on a busy morning on their way to work, receive the local high school sports scores, follow their favorite pasttime, or follow other interests on a daily basis.

Although described with reference to Yellow Pages and White Pages, the selection of advertisements can be made based on one or more other directories of telephone numbers or other network addresses categorized by at least one criterion (e.g. classified by type of business) and associated with marketing and advertising efforts. Further, although described herein for use with audio content items, the teachings herein can be applied to video content items and other multimedia content items.

Figure 2:
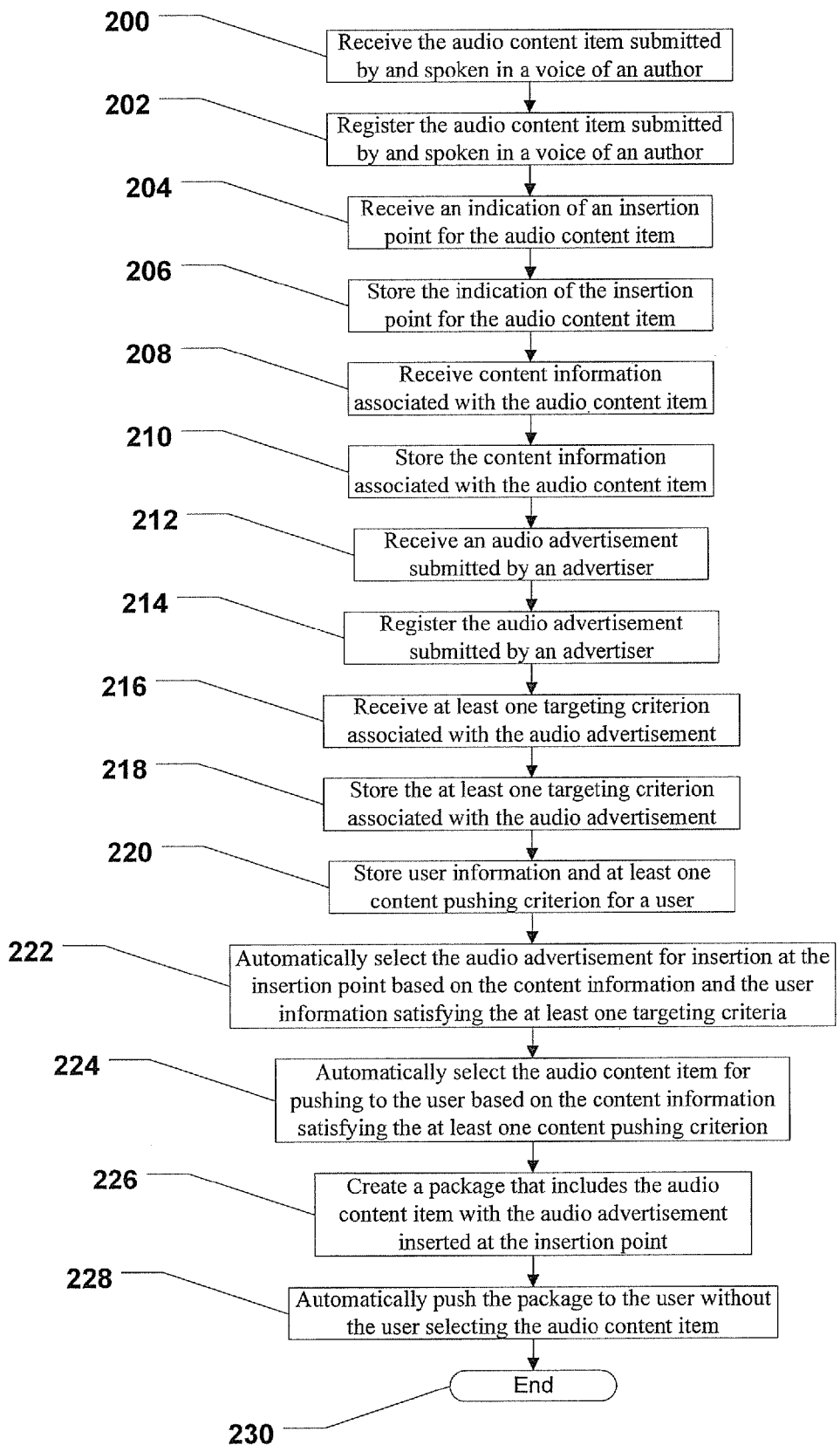
FIG. 2 is a flowchart of an embodiment of a method of providing personalized audio content.

Referring to FIG. 2, a method of providing personalized audio content is shown and commences at block 200. At block 200, an audio content item is received. In a particular embodiment, the audio content is submitted by and spoken in a voice of an author. At block 202, the audio content item received from the author is registered. Moving to block 204, an indication of an insertion point for the audio content item is received. At block 206, the indication of the insertion point for the audio content item is stored.

Proceeding to block 208, content information associated with the audio content item is received. At block 210, the content information associated with the audio content item is stored. Continuing to block 212, an audio advertisement is received. In a particular embodiment, the audio advertisement is submitted by an advertiser. At block 214, the audio advertisement that is submitted by the advertiser is registered. Further, at block 216, at least one targeting criterion associated with the audio advertisement is received. The at least one targeting criterion is stored, at block 218.

Moving to block 220, user information and at least one content pushing criterion for a user is stored. Moreover, at block 222, the audio advertisement is automatically selected for insertion at the insertion point based on the content information and the user information satisfying the at least one targeting criteria. At block 224, the audio content item is automatically selected for pushing to the user based on the content information satisfying the at least one content pushing criterion. Further, at block 226, a package is created that includes the audio content item with the audio advertisement inserted at the insertion point. At block 228, the package is automatically pushed to the user without the user selecting the audio content item. The method then ends at state 230.

In a particular embodiment, the individual method steps may be performed by a single component described in conjunction with FIG. 1 or at multiple components as described in conjunction with FIG. 1. Further, the method steps may be performed in an order different than the order shown in FIG. 2.

Figure 3:
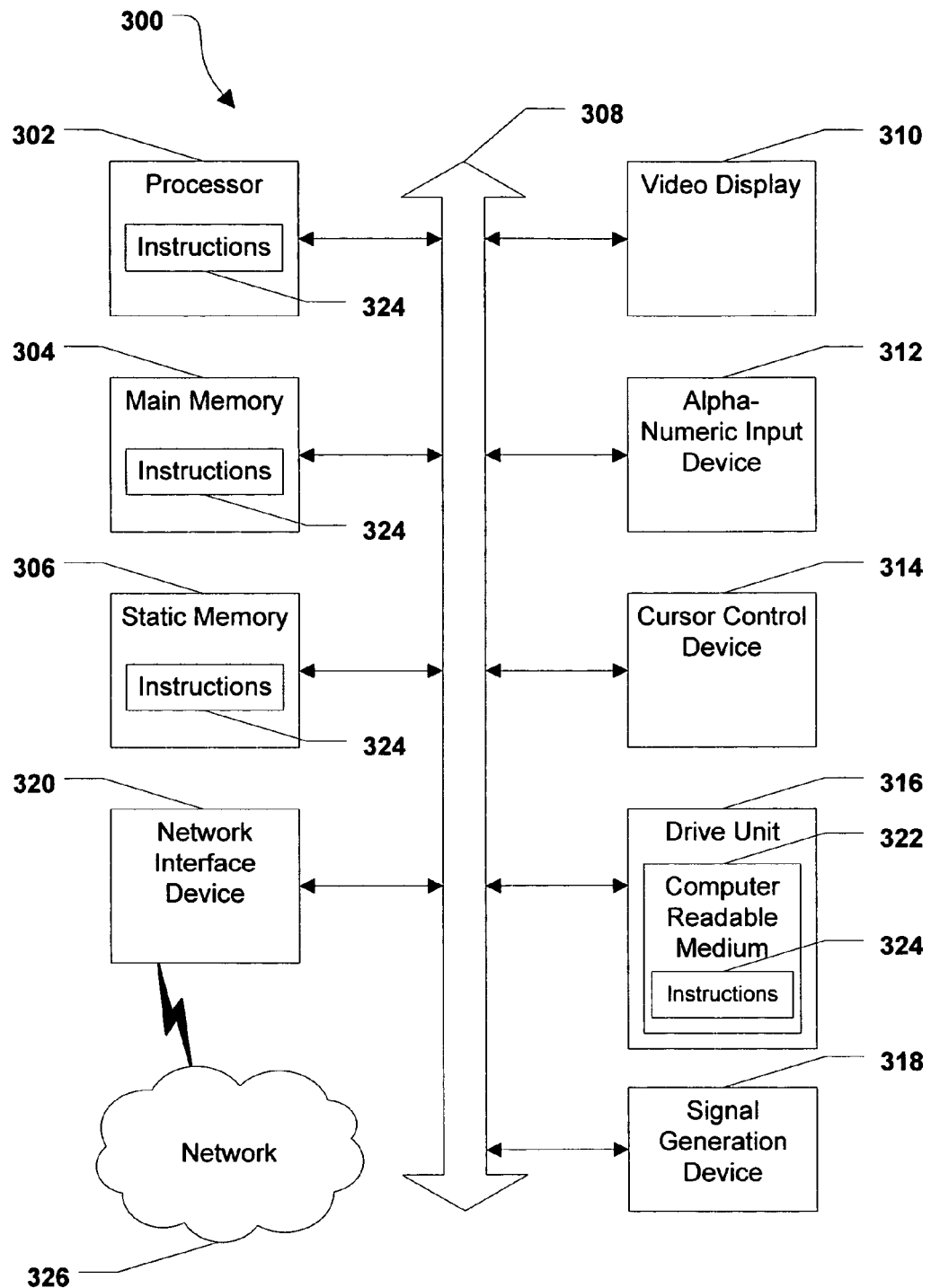
FIG. 3 is a diagram of one embodiment of a general computer system.

Referring to FIG. 3, an illustrative embodiment of a general computer system is shown and is designated 300. One or more of the components described in conjunction with FIG. 1 can operate on a computer system similar to that shown in FIG. 3. Further, portions of the components can operate on a first computer system that includes one or more of the elements described in conjunction with FIG. 3. Other portions of the components shown in FIG. 1 can operate on a second computer system, or on a third computer system, that includes one or more of the elements shown in FIG. 3. The computer system 300 can include a set of instructions that can be executed to cause the computer system 300 to perform any one or more of the methods or computer based functions disclosed herein. The computer system 300 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 300 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 300 can be implemented using electronic devices that provide voice, video or data communication. Further, while a single computer system 300 is illustrated, the term "system" shall also be taken to include any collection of systems or sub-systems that individually or jointly execute a set, or multiple sets, of instructions to perform one or more computer functions.

As illustrated in FIG. 3, the computer system 300 may include a processor 302, e.g., a central processing unit (CPU), a graphics processing unit (GPU), or both. Moreover, the computer system 300 can include a main memory 304 and a static memory 306, that can communicate with each other via a bus 308. As shown, the computer system 300 may further include a video display unit 310, such as a liquid crystal display (LCD), an organic light emitting diode (OLED), a flat panel display, a solid state display, or a cathode ray tube (CRT). Additionally, the computer system 300 may include an input device 312, such as a keyboard, and a cursor control device 314, such as a mouse. The computer system 300 can also include a disk drive unit 316, a signal generation device 318, such as a speaker or remote control, and a network interface device 320.

In a particular embodiment, as depicted in FIG. 3, the disk drive unit 316 may include a computer-readable medium 322 in which one or more sets of instructions 324, e.g. software, can be embedded. Further, the instructions 324 may embody one or more of the methods or logic as described herein. In a particular embodiment, the instructions 324 may reside completely, or at least partially, within the main memory 304, the static memory 306, and/or within the processor 302 during execution by the computer system 300. The main memory 304 and the processor 302 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 224 or receives and executes instructions 224, so that a device connected to a network 226 can communicate voice, video or data over the network 226. Further, the instructions 224 may be transmitted or received over the network 226 via the network interface device 220.

While the computer-readable medium is shown to be a single medium, the term "computer-readable medium" includes a single non-transitory medium or multiple non-transitory media, such as a centralized or distributed database, and/or associated caches and servers that store one or more sets of instructions. The term "computer-readable medium" shall also include any medium that is capable of storing a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device. Accordingly, the disclosure is considered to include any one or more of a non-transitory computer-readable medium and other equivalents and successor media, in which data or instructions may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A system comprising:
   at least one audio content registry component to receive an audio content item submitted by and spoken in a voice of an author of the audio content item, to register the audio content item, to receive and store an indication of an insertion point for an audio advertisement in the audio content item, and to receive and store content information associated with the audio content item, wherein the at least one audio content registry component comprises an interactive voice response (IVR) unit which provides options for the author to record the audio content item and to indicate the insertion point within a telephone call;
   at least one audio advertising registry component to receive the audio advertisement from an advertiser, to receive and store at least one targeting criterion associated with the audio advertisement, and to register the audio advertisement for insertion into one or more audio content items based on the at least one targeting criterion;
   a user profile component to store user information and at least one content pushing criterion for a user, the at least one content pushing criterion specified by the user;
   a download packager to automatically select the audio content item for pushing to the user in response to determining that the content information satisfies the at least one content pushing criterion, the download packager to automatically insert the audio advertisement in the insertion point based on the content information and based on the user information satisfying the at least one targeting criterion, the download packager to create a package that includes the audio content item with the audio advertisement inserted at the insertion point; and
   a push component to automatically push the package to the user without the user selecting the audio content item.

2. The system of claim 1 wherein the IVR unit further provides an option for the author to input the content information within the telephone call.

3. The system of claim 1 wherein the IVR unit further provides an option for the author to indicate a start time at which the audio content item is made available for pushing to users.

4. The system of claim 1 wherein the IVR unit further provides an option for the author to indicate an end time at which the audio content item is no longer available for pushing to users.

5. The system of claim 1 wherein the at least one audio content registry component stores author preferences for the author, the author preferences comprising a first set of preferences when submitting audio content from a computer and a second set of preferences when submitting audio content by telephone to the IVR unit.

6. The system of claim 1 wherein the at least one audio advertising registry component comprises an interactive voice response (IVR) unit which provides an option for the advertiser to record the audio advertisement within a telephone call.

7. The system of claim 6 wherein the IVR unit further provides an option for the advertiser to input the at least one targeting criterion within the telephone call.

8. The system of claim 6 wherein the at least one audio advertising registry component stores advertiser preferences for the advertiser, the advertiser preferences comprising a first set of preferences when submitting audio advertising from a computer and a second set of preferences when submitting audio advertising by telephone to the IVR unit.

9. The system of claim 1 wherein the at least one targeting criterion comprises a criterion to exclude the audio advertisement from insertion into audio content based on the content information or based on an advertiser profile.

10. The system of claim 1 wherein the at least one targeting criterion comprises a criterion to insert the audio advertisement into the audio content item based on a data element associated with the advertiser in a Yellow Pages database matching a term in the content information.

11. The system of claim 10 wherein the criterion is to insert the audio advertisement into the audio content item based on a category of the advertiser in the Yellow Pages database matching the term in the content information.

12. The system of claim 1 wherein the at least one targeting criterion comprises a criterion to insert the audio advertisement into the audio content item based on a data element associated with the advertiser in a Yellow Pages database matching a term in the user information.

13. The system of claim 12 wherein the criterion is to insert the audio advertisement into the audio content item based on a category of the advertiser in the Yellow Pages database matching the term in the user information.

14. The system of claim 1 wherein the at least one targeting criterion comprises a criterion to insert the audio advertisement into the audio content item based on a location of the advertiser in a Yellow Pages database being proximate to a location of the user.

15. The system of claim 1 wherein the at least one audio content registry component comprises a registry of a first plurality of audio content items submitted by a plurality of authors and a second plurality of audio content items discovered by a content discovery component based on an Internet search.

16. The system of claim 15 further comprising a registry maintenance component to automatically remove objectionable audio content items and no-longer-existent audio content items from the registry.

17. The system of claim 1 wherein the package is pushed to the user via at least one of a digital subscriber line and a wireless data network.

18. A method comprising:
receiving an audio content item submitted by and spoken in a voice of an author of the audio content item;
registering the audio content item;
storing an indication of an insertion point for the audio content item in response to receiving the indication of the insertion point from the author, wherein an interactive voice response (IVR) unit provides options for the author to record the audio content item and to indicate the insertion point within a telephone call;
receiving and storing content information associated with the audio content item in response to receiving the content information from the author;
registering an audio advertisement in response to receiving the audio advertisement from an advertiser;
receiving and storing at least one targeting criterion associated with the audio advertisement in response to receiving the at least one targeting criterion from the advertiser;
storing user information and at least one content pushing criterion for a user, the at least one content pushing criterion specified by the user;
automatically selecting the audio content item for pushing to the user based on the content information satisfying the at least one content pushing criterion;
automatically selecting the audio advertisement for insertion at the insertion point based on the content information and based on the user information satisfying the at least one targeting criterion;
creating a package that includes the audio content item with the audio advertisement inserted at the insertion point; and
automatically pushing the package to the user without the user selecting the audio content item.

19. A non-transitory computer-readable medium having computer-readable program instructions that are executable by a computer to cause the computer to:
receive an audio content item submitted by and spoken in a voice of an author of the audio content item;
store an indication of an insertion point for the audio content item in response to receiving the indication of the insertion point from the author, wherein an interactive voice response (IVR) unit provides options for the author to record the audio content item and to indicate the insertion point within a telephone call;
store content information associated with the audio content item in response to receiving the content information from the author;
register an audio advertisement in response to receiving the audio advertisement from an advertiser;
store at least one targeting criterion associated with the audio advertisement in response to receiving the at least one targeting criterion from the advertiser;
store user information and at least one content pushing criterion for a user, the at least one content pushing criterion specified by the user;
automatically select the audio content item for pushing to the user based on the content information satisfying the at least one content pushing criterion;
automatically select the audio advertisement for insertion at the insertion point based on the content information and based on the user information satisfying the at least one targeting criterion;
create a package that includes the audio content item with the audio advertisement inserted at the insertion point; and
automatically push the package to the user without the user selecting the audio content item.

* * * * *